April 4, 1961

E. W. BIRO ET AL 2,977,685

DIAL INDICATORS

Filed Jan. 16, 1959

INVENTORS
EDWARD W. BIRO
JOHN L. PETZ

BY *John A. Hall*

ATTORNEY

April 4, 1961  E. W. BIRO ET AL  2,977,685
DIAL INDICATORS

Filed Jan. 16, 1959  2 Sheets—Sheet 2

INVENTORS
EDWARD W. BIRO
JOHN L. PETZ
BY *John A. Hall*
ATTORNEY

United States Patent Office 2,977,685
Patented Apr. 4, 1961

2,977,685

DIAL INDICATORS

Edward W. Biro, R.F.D. 2, Feller-Newmark Road, Box 71, Red Hook, N.Y., and John L. Petz, Myers Corner Road, Wappingers Falls, N.Y.

Filed Jan. 16, 1959, Ser. No. 787,202

5 Claims. (Cl. 33—172)

This invention relates to dial indicators of the rack and pinion type.

The object of the invention is to provide means to insure the automatic return to rest of the components in the same relative positions whereby the dial hand will not vary in its normal position regardless of the manner in which that position is reached. The present invention is particularly applicable to dial indicators of the so-called shock proof type where the return of the dial hand will vary from an extremely gentle to a violent movement. In conventional indicators this often results in displacement of the hand so that if the dial has been adjusted to a very accurate zero indication after the hand has been gently eased back to zero, it will give a different indication when it is allowed to return to zero by a violent motion.

Such an error may be exaggerated by looseness in the fit of the spindle in the rack bar and since it is necessary to have a certain degree of freedom in this fit the trouble may not be entirely cured by providing a very tight fit. Accordingly means have been provided to insure the return to normal position of the rack bar and the spindle always in the same relative positions.

In accordance with this invention, means, operative when the rack bar comes to the upper limit of its travel along the spindle, to apply a side or lateral thrust to the rack bar so that in such normal position a given longitudinal line along the inside surface of the bore through the rack bar will always be in contact with a corresponding longitudinal line on the spindle and a space comprehending the entire difference between the outside diameter of the spindle and the inside diameter of the bore in the rack bar will be located diametrically opposite to this line of contact.

Thus, if this lateral thrust is applied in a direction away from the meshing teeth of the rack and the gear operated thereby a slight looseness in this intermeshing fit will be produced but since the gear is always biased by a hair spring the cooperative relationship will always be the same.

Generically the invention resides in the provision of means to apply a lateral thrust to the rack block whereby actual contact between the said block and the spindle on which it is mounted is made invariably along the same line.

Specifically, and by way of example, such a lateral thrust may be applied in a number of different manners, as by spring pressure, by a wedging device or by distortion of the rack itself.

A feature of the invention is a ball bearing or other minimum friction means mounted on the rack block and bearing on the spindle in such manner as to apply a lateral thrust to the rack block whereby the cooperative relationship between the gear teeth and the teeth on the rack block will remain constant and invariable regardless of the various types of relative movement between the rack block and the spindle, that is regardless of whether such relative movement is slow and gentle or violent. In accordance with this specific embodiment the wall of the rack block opposite to the teeth may be drilled about midway of its length and a spring pressed practically frictionless ball inserted therein to bear against the spindle.

Another feature of the invention is a top collar fixed to the spindle and a bottom spring pressed collar movable longitudinally along said spindle each having a bevelled surface bearing against the rack block. This element has its cooperatively related surfaces countersunk on an axis parallel to but offset from the axis of the spindle whereby pressure exerted on said rack block by said two collars will provide a lateral thrust to said bearing block and will wedge it in a desired direction, as shown.

The principle in the operation of the various species shown and described is that a longitudinal thrust applied to the rack block particularly when it comes to rest with the hand at a zero or starting position is translated to a lateral thrust which is invariably applied in one direction so that an exact spatial relation between the gear and the rack bar is maintained.

Other features will appear hereinafter.

The drawings consist of two sheets having five figures, as follows.

Figure 4:
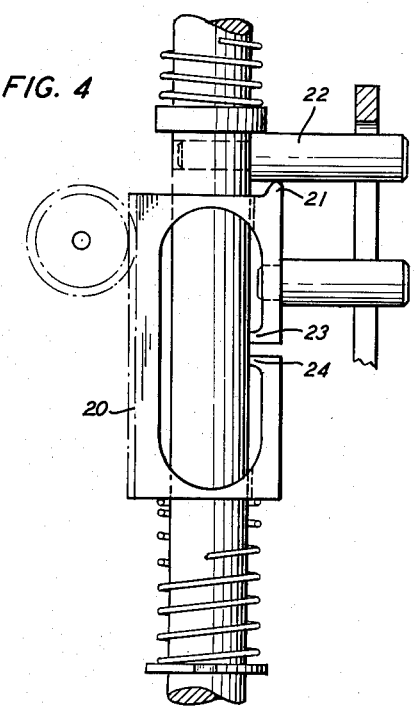
Figure 5:
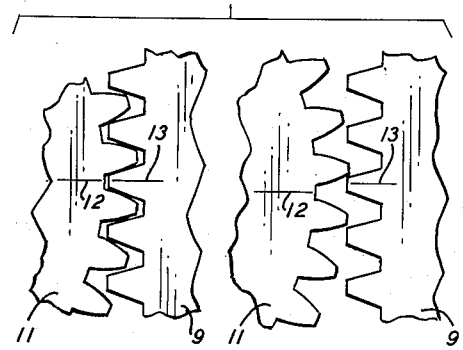

Fig. 4 shows a like fragmentary view in which the rack bar is rendered somewhat flexible and is so constructed that the normal pressure against the top and bottom thereof in its normal position will cause a slight flexing thereof which is translated into a lateral thrust; and Fig. 5 is a much enlarged cross sectional view of the intermeshed teeth of the gear and the rack where in one case a tight fit between the gear and the rack has been produced and in the other case such fit is very loose and showing how the dial hand is thereby altered in its indication.

The device of the present invention, excepting for the novel features herein shown and described is an exact copy of the device disclosed in Patent 2,799,941 issued to Emery, July 23, 1957, and that disclosure is incorporated herein as a part hereof for the purpose of disclosing such conventional elements as the dial, the dial hand and the train of gears, including the backlash gear, interconnecting the pinion driven by the rack and the dial hand.

It is believed to be readily apparent that due to the conventional hair spring incorporated in these dial indicators for the purpose of always exerting some pressure on the dial hand and its pinion to take up any possible looseness in the gear train, there will be a slight difference in position of the hand as between tightly meshed teeth and loosely meshed teeth. A defect of all such dial indicators heretofore is that due to the necessary play between the rack bar and the spindle, this play may appear differently because of the way in which the device has returned to normal. If the return to normal has been through a gentle movement, the parts may come to rest with loosely meshed teeth whereas if the return to normal has been violent then the parts may come to rest with tightly meshed teeth and there will be deviation in the two resting positions of the hand.

The present invention resides in the provision of means to exert a lateral thrust on the rack bar whereby the relative positions of the gear and the rack bar, regardless of the manner of the return to normal position will be invariable.

Figure 1:
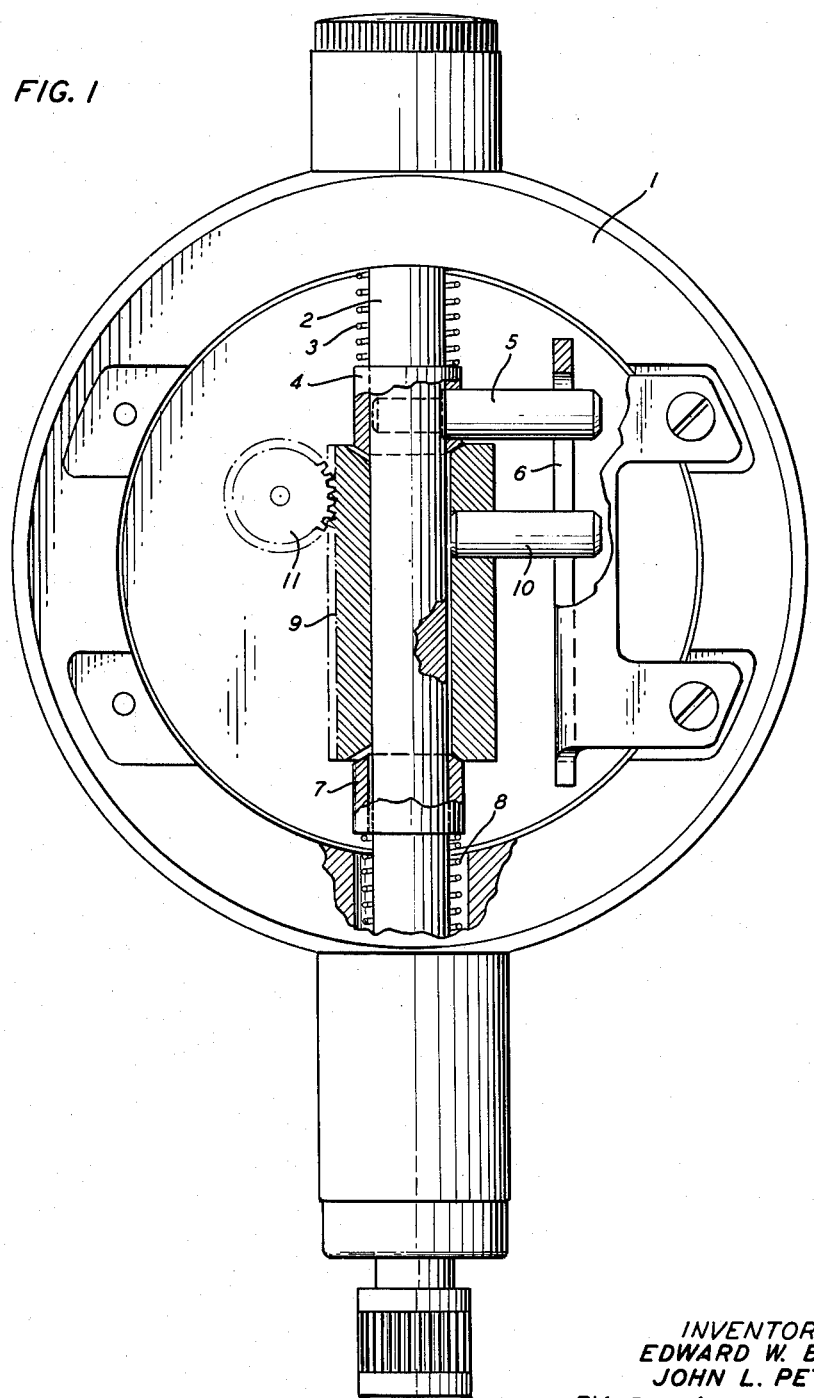
Fig. 1 is a face view, partly in section, of the back of a dial indicator with the cover removed to show the relationship of the gear, the rack bar and the means employed to produce a lateral thrust when the device has returned to its normal unoperated position.

Fig. 1 is a view of the back of a dial indicator, much enlarged to give a clear view of the clearance between the inside bore of the rack bar and the outside diameter of the spindle. In this drawing, the case 1 is arranged to hold a spindle 2, urged downwardly by a spring 3 abutting the case above and a collar 4 below, the collar 4 being fixed to the spindle 2 by the guide pin 5 riding in the guide 6 to prevent the rotation of the spindle 2. Another collar 7, fitted loosely on the spindle 2 serves as a bearing to communicate the pressure of the spring 8 upwardly to the rack bar 9 also fitted loosely on the spindle 2. The rack bar 9 is also provided with a pin 10 riding in the guide 6 to prevent any rotation of the rack bar. Where such a device is used to operate forwardly from a given starting point, the spindle at its top is provided with a stop, as shown for instance in Patent 2,799,-941 issued July 23, 1957, to Emery, to limit the downward travel thereof. The spring 3 will exert more force than the spring 8, but the spring 8 will serve to hold the rack bar 9 solidly against the collar 4, except when the spindle 2 is moved violently upward; this being the essential and conventional shock proof construction.

The rack bar is provided with a straight line of teeth meshing with a gear 11, which in turn, as shown in the Emery patent, intermeshes through a train of gears to a pinion to operate a dial hand and to rotate such hand over the conventional dial. Also, conventionally, a hair spring driven gear meshes with the said pinion to always exert a biasing force on the gear 11, mainly for taking up any looseness in the gear train and to bring the hand as closely as possible to a given zero position.

However, this conventional construction has a fault which is portrayed in Fig. 5 which shows in greatly enlarged form a fragment of the gear 11 and a fragment of the rack on the rack bar 9 in two situations, that to the left being when the teeth of the gear and the rack mesh tightly and that to the right being when the same teeth mesh loosely. To indicate the relative positions a scratch 12 has been made on the gear 11 and a scratch 13 has been made on the rack 9 and it will be seen that the gear 11 has moved slightly in the right hand loose fit and it will be understood that this will be communicated to the hand of the indicator.

The object of the present invention is to render the cooperative relationship of the gear 11 and the rack 9 invariable, that is to provide either a tight fit or a loose fit, it being immaterial whether it is one or the other, but it must always be the same. In conventional dial indicators, due to the necessary play between the spindle and the rack bar it is sometimes one and sometimes the other due to the manner of operation, but in accordance with the present invention, means is provided to exert a lateral thrust on the rack bar so that the cooperative relationship between the gear 11 and the rack 9 is always the same.

This means for providing a lateral thrust to the rack bar may take a variety of forms, one of which is shown in Fig 1. Here the ends of the collar 4 and the collar 7 are bevelled so that they present an inclined surface to the contacting surfaces of the rack bar 9. The bore of this piece is countersunk and on a centerline offset toward the left from the common centerline of the spindle and the said bore whereby the pressure of the two collars 4 and 7 is translated into a lateral thrust exerted on the rack bar resulting in the movement of the rack bar toward the right. The actual contact between the inside surface of the rack bar and the outside surface of the spindle is along a single longitudinal line directly under the rack bar teeth and all the looseness between these elements is diametrically opposite, as may be seen at the cross sectioned part of the spindle. Thus the collars 4 and 7 wedge the rack bar 9 toward the right and hence the final cooperative position of the teeth of the gear and the teeth of the rack bar is always the same.

Figure 2:
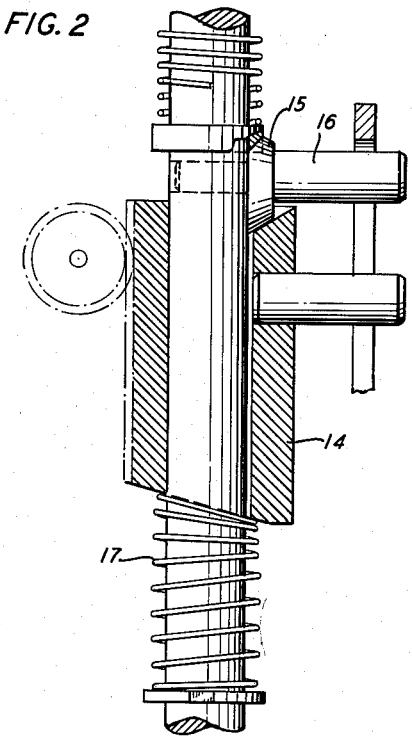
Fig. 2 is a fragmentary like view showing the means for wedging the rack bar in a direction away from the gear by means of a camming surface at the upper end of the rack bar and an inclined surface at the bottom thereof on which one of the operating springs of the device bears.

Fig. 2 shows another means for wedging the rack bar toward the right. This consists of a bevelled collar 15 affixed to the base of the guide pin 16 and arranged to bear on an inside bevelled surface of the rack bar. The bottom surface of the rack bar 14 is cut off at an angle so that the pressure of the spring 17 has a lateral component. Thus in this variation the rack bar is urged toward the right by a combination of the wedging action of the collar 15 and the lateral component of the pressure exerted by the spring 17.

Figure 3:
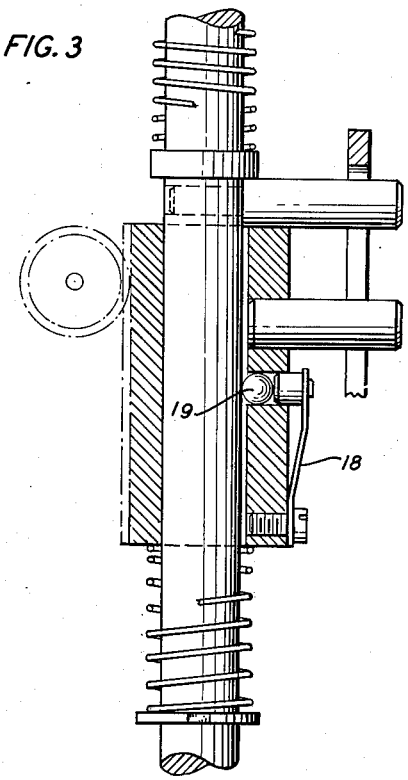
Fig. 3 shows a like fragmentary view in which a flat spring attached to the rack bar exerts pressure on the spindle through a bearing working through a recess in the rack bar.

The variation shown in Fig. 3 is of a very ample nature. A spring 18 is arranged to exert lateral pressure on a thrust bearing consisting primarily of a ball bearing 19, caged in an aperture drilled in the rack bar.

Fig. 4 shows another variation of this means for translating the longitudinal thrust against the rack bar into a lateral thrust. In this case the rack bar 20 is skeletonized until it becomes flexible whereupon the longitudinal thrust exerted between the bottom surface thereof and a projection 21 against the guide pin 22 produces a deformation of the rack bar whereby the ends of the two arms 23 and 24 both move in toward the left to bear against the spindle and thus move the body of the rack bar toward the right.

What is claimed is:

1. In a dial indicator, a case, a spindle mounted in said case and having a movement of translation along the longitudinal axis thereof, a toothed rack bar slidably mounted on said spindle, a pinion intermeshing with said toothed rack and means for insuring an invariable return of said pinion to exactly the same starting position thereof consisting of a spring driven gear intermeshing with said pinion and inclined surfaces on said rack bar to produce a lateral thrust thereof to maintain an exact spatial relation between said rack bar and its said intermeshing gear.

2. In a dial indicator, a case, a spindle mounted in said case and having a movement of translation along the longitudinal axis thereof, a toothed rack bar slidably mounted on said spindle, a pinion intermeshing with said toothed rack and means for insuring an invariable return of said pinion to exactly the same starting position thereof consisting of a spring driven gear intermeshing with said pinion and collars on said spindle having inclined surfaces constructed and arranged to cooperatively bear on similarly inclined faces provided on said rack bar, said latter inclined faces on said rack bar being offset whereby contact between said inclined surfaces of said collars and said inclined surfaces of said rack bar are effective only at one side of said rack bar to wedge said rack bar to one side to maintain an exact spatial relation between said rack bar and its said intermeshing gear.

3. In a dial indicator, a case, a spindle mounted in said case and having a movement of translation along the longitudinal axis thereof, a toothed rack bar slidably mounted on said spindle, a pinion intermeshing with said toothed rack and means for insuring an invariable return of said pinion to exactly the same starting position thereof consisting of a spring driven gear intermeshing with said pinion and means to translate a longitudinal thrust on said rack bar in its normal position to a lateral thrust to maintain an exact spatial relation between said rack bar and its said intermeshing gear.

4. In a dial indicator, a case, a spindle mounted in said case and having a movement of translation along the longitudinal axis thereof, a toothed rack bar slidably mounted on said spindle, a pinion intermeshing with said toothed rack and means for insuring an invariable return of said pinion to exactly the same starting position thereof consisting of a spring driven gear intermeshing with said pinion and means to exert a longitudinal thrust on said rack bar in its normal position, said rack bar being constructed and arranged to respond to said longitudinal thrust and to translate said thrust to a lateral thrust to maintain an exact spatial relation between said rack bar and its said intermeshing gear.

5. In a dial indicator, a case, a spindle mounted in said case and having a movement of translation along the longitudinal axis thereof, a toothed rack bar slidably mounted on said spindle, a pinion intermeshing with said toothed rack and means for insuring an invariable return of said pinion to exactly the same starting position thereof consisting of a spring driven gear intermeshing with said pinion and means to exert a longitudinal thrust on said rack bar in its normal position, said rack bar being deformable and responsive by deformation to said longitudinal thrust to translate said thrust into a lateral thrust to maintain an exact spatial relation between said rack bar and its said intermeshing gear.

References Cited in the file of this patent

UNITED STATES PATENTS

| | | |
|---|---|---|
| 2,563,402 | Emery et al. | Aug. 7, 1951 |
| 2,799,941 | Emery | July 23, 1957 |

FOREIGN PATENTS

| | | |
|---|---|---|
| 707,744 | Germany | July 2, 1941 |